(12) United States Patent
Marinov et al.

(10) Patent No.: US 10,881,117 B2
(45) Date of Patent: Jan. 5, 2021

(54) TEA-BASED BEVERAGE

(71) Applicant: Conopco, Inc., Englewood Cliffs, NJ (US)

(72) Inventors: George Simeonov Marinov, London (GB); John Turner Mitchell, Bedford (GB); Gleb Yakubov, Yeronga (AU)

(73) Assignee: CONOPCO, INC., Englewood Cliffs, NJ (US)

( * ) Notice: Subject to any disclaimer, the term of this patent is extended or adjusted under 35 U.S.C. 154(b) by 211 days.

(21) Appl. No.: 15/561,290

(22) PCT Filed: Mar. 7, 2016

(86) PCT No.: PCT/EP2016/054819
§ 371 (c)(1),
(2) Date: Sep. 25, 2017

(87) PCT Pub. No.: WO2016/155983
PCT Pub. Date: Oct. 6, 2016

(65) Prior Publication Data
US 2018/0125086 A1   May 10, 2018

(30) Foreign Application Priority Data
Mar. 31, 2015 (EP) ..................... 15161832

(51) Int. Cl.
A23F 3/16       (2006.01)
(52) U.S. Cl.
CPC .................. A23F 3/163 (2013.01)
(58) Field of Classification Search
CPC ....................................... A23F 3/163
USPC ....................................... 426/597
See application file for complete search history.

(56) References Cited

U.S. PATENT DOCUMENTS

| | | | |
|---|---|---|---|
| 4,851,252 A | 7/1989 | Greither et al. | |
| 4,935,256 A * | 6/1990 | Tsai | A23F 3/163 426/330.3 |
| 5,851,578 A | 12/1998 | Gandhi | |
| 6,790,268 B2 | 9/2004 | Lee et al. | |
| 7,279,193 B2 * | 10/2007 | Oishi | A23F 3/163 426/106 |
| 7,948,321 B2 | 5/2011 | Honda et al. | |
| 2002/0076431 A1 | 6/2002 | Umeda et al. | |
| 2007/0237843 A1 | 10/2007 | Marcati | |
| 2010/0113390 A1 | 5/2010 | Fujikawa et al. | |

FOREIGN PATENT DOCUMENTS

| | | |
|---|---|---|
| CN | 1409976 | 4/2003 |
| CN | 101326935 | 12/2008 |
| CN | 101433294 | 5/2009 |
| CN | 102986995 | 3/2013 |
| CN | 103168873 | 6/2013 |
| CN | 103168874 | 6/2013 |
| CN | 103169106 | 6/2013 |
| CN | 103202360 | 7/2013 |
| CN | 103251021 | 8/2013 |
| CN | 103416823 | 12/2013 |
| CN | 103549083 | 2/2014 |
| CN | 103651887 | 3/2014 |
| CN | 203636837 | 3/2014 |
| EP | 0249853 | 12/1987 |
| EP | 1361798 | 5/2006 |
| EP | 1226826 | 7/2007 |
| EP | 2743277 | 6/2014 |
| GB | 2487774 | 4/2013 |
| JP | 60196147 | 10/1985 |
| JP | 11018739 | 1/1990 |
| JP | 2000116327 | 4/2000 |
| JP | 2003055234 | 2/2003 |
| JP | 2003144102 | 5/2003 |
| JP | 2005151856 | 6/2005 |
| JP | 2007019631 | 1/2007 |
| JP | 2007091631 | 4/2007 |
| JP | 2008067665 | 3/2008 |
| JP | 2008099656 | 5/2008 |
| JP | 2008125500 | 6/2008 |
| KR | 20020070222 | 9/2002 |
| KR | 20030023687 | 3/2003 |
| KR | 20040027203 | 4/2004 |
| KR | 2040092977 | 11/2004 |
| KR | 20050031860 | 4/2005 |

(Continued)

OTHER PUBLICATIONS

Matsuhiro, B. et al. Carbohydrate Polymer, 63: 263-267 (2006) (Year: 2006).*
Hayashi, N. et al. Biosci. Biotechnol. Biochem. 69: 1306-1310 (2005) (Year: 2005).*
J. Sci. Fd. Agric. 28: 519-529 (1977) (Year: 1977).*
Sengkhamparn, N. et al., Food Hydrocolloids. 24: 35-41 (2010) (Year: 2010).*
Yamanaka, N. et al. Food Sci. Technol., 2: 108-112 (1996) (Year: 1996).*
Loose Leaf Prickly Pear Black Tea with Dried Cactus Fruit Pieces, Maya Tea Company, 2014, pp. 1-2; https?//web.archive.org/web/20140330160834/http://www.mayatea.com/products/prickly-ear-black?; XP055211898.

(Continued)

*Primary Examiner* — Hamid R Badr
(74) *Attorney, Agent, or Firm* — Foley & Lardner LLP

(57) ABSTRACT

The invention relates to a tea-based beverage precursor comprising tea solids and at least 0.01% w/w water-dispersible biopolymer, wherein the water-dispersible biopolymer has a Trouton ratio of at least 300, preferably 400, more preferably 450 measured as a 0.2% w/w aqueous solution at 20 degrees Celsius, wherein the weight ratio of tea solids to water-dispersible biopolymer is at least 2:1, preferably at least 3:1. The invention also relates to a tea-based beverage comprising water and the tea-based beverage precursor of the first aspect of the invention, wherein the tea-based beverage comprises 0.0001 to 0.1% w/w of the water-dispersible biopolymer.

20 Claims, No Drawings

(56) References Cited

FOREIGN PATENT DOCUMENTS

| KR | 20100013565 | 2/2010 |
|---|---|---|
| KR | 20130001517 | 1/2013 |
| KR | 20110080687 | 7/2013 |
| RU | 2008109431 | 9/2009 |
| WO | WO02065846 | 8/2002 |
| WO | WO2005115131 | 12/2005 |
| WO | WO2008047873 | 4/2008 |
| WO | 20130066048 | 3/2013 |
| WO | WO2013087916 | 6/2013 |
| WO | WO2013087918 | 6/2013 |

OTHER PUBLICATIONS

Benk E., Tea-like products., Verbraucherdienst 1981, 1981, pp. 160-162-165No English translation, 26-7.
Kil-Suk Jo; Jeong-Ryong Do; Jae-Geun, Pretreatment conditions of Porphyrayezoensis, Undariapinnatifida and Laminariareligiosa for functional algae-tea, Journal of the Korean Society of Food Science and Nutrition 1998, vol. 27, No. 2, pp. 275-280, 1998, pp. 275-280Article provide by Karen Haslegrave Kathey Towler (TIS): published in Korean language only., 27-2.
Lee Seong-Kye et al., Effect of Ginseng and Herbal Plant Mixtures on Anti-Obesity in Obese SD Rat Induced by High Fat Diet, Journal of the Korean Society of Food Science and Nutrtition, 2008, pp. 437-444; XP053026788, vol. 37, No. 4.
Li Xingxia, The Developmentof Undaria Pinnatifida Soya Bean Milk, China Brewing Product Development, 2013, pp. 155-158Article provide by Karen Haslegrave Kathey Towler (TIS) published in Korean language only., 32-2.
Lothar Mindt Karl Saag et al., Cactaceae Mucilage Composition, Journal of the Science of Food and Agriculture, 1975, pp. 993-1000; XP055211604, vol. 26.
Mats Stading, Extensional rheology of biopolymer systems, Annual Transactions of the Nordic Rheology Society, 2011, pp. 1-3; XP055210558, vol. 19.
Mike Stones, New organic-certified fucoidan for functional beverages. Fucorich, Decision News Media,—Breaking News on Supplements, Health and Nutrition, Oct. 14, 2009, pp. 1-2.
Nagai, Takeshi, The Tea Comparative Studies in the Functions of tea and beveraes made from se algae, Trends in Comparative Biochemistry and Physiology, 2004, pp. 75-82, 10.
Nagai, Takeshi; Suzuki, Nobutaka; Nagashima, Toshio, Angiotensin I-converting enzyme inhibitory activities of beverages made from sea algae and commercially available tea extracts, Journal of Food, Agriculture & Environment, 2006, pp. 17-19, 4-3 and 4, WFL.
Nefzaoui et al., Scientific and Technical Contributions Review of Medicinal Uses of Cactus, Cactusnet Newsletter, 2007, pp. 1-67; XP055211865; http://www.cactusnet.org/documents/issue11version3final.pdf, Issue 11.

Nipaporn Sengkhamparn et al., Physicochemical properties of pectins from okra (*Abelmoschus esculentus* (L.) Moench), Food Hydrocolloids, 2010, pp. 35-41; XP026677339, vol. 24, No. 1, Elsevier.
Peter A. Sopade; Afodia L. Kassuml and Dahiru J. M. Adamu, Rheological characterization of some Nigerian traditional soups, International Journal of Food Science & Technology, 1993, pp. 647-653, 28-6.
R. Ndjouenkeu; J. O.Akingbala and G.B. Oguntimein, Emulsifying Properties of Three African Food Hydrocolloids, Plant Foods for Human Nutrition, 1997, pp. 245-255, 52-3, Kluwer Academic Publishers, Netherlands.
Search Report & Written Opinion in PCTEP2016054819, dated Jun. 1, 2016.
Search Report and Written Opinion in EP15161832, dated Sep. 15, 2015.
Sengkhamparn et al., Characterisation of cell wall polysaccharides from okra (*Abhelmoschus esculentus* (L.) Moench), Carbohydrate Research, 2009, pp. 1824-1832; XP026601619, vol. 344, No. 14, Elsevier.
Sengkhamparn et al., Okra pectin contains an unusual subsitution of its rhamnosyl residues with acetyl and alpha-linked galactosyl groups, Carbohydrate Research, 2009, pp. 1842-1851; XP026601621, vol. 344, No. 14, Elsevier.
Shilpi Gupta; Nissreen Abu-Ghannam, Recent Developments in the Applicationof Seaweeds or Seaweed Extracts as a means for enhancing the safety and quality attributes of foods, Innovative Food Science and Emerging Technologies, 2011, pp. 600-609, 12, Elsevier.
Stintzing et al., Phytochemical and nutritional significance of cactus pear, European Food Research and Technology, 2001, pp. 396-407; XP055210824, vol. 212, No. 4.
Urquidi, R. L., Gums for food uses—a review, SO International Flavours and Food Additives, 1978, pp. 73-75-76, 9-2.
W.A.J.P. Wijesinghe et al., Biological activites and potential industrial applications of fucose rich sulfated polysaccharides and fucoidans isolated from brown seaweeds: A review, Carbohydrate Polymers, 2012, pp. 13-20; XP028885593, vol. 88, No. 1, Elsevier.
Miura Hiroshi; Qualities and Gelation Characteristics of Pectin; Polymers; 1996; pp. 294-301 (w original & Human Translaiton); 15.
Gatenby; Viscosity, Consistency and Surface Tension—What Are These Things; Aug. 27, 2014 12:56:00 PM; CSC Scientific Blog; https://www.cscscientific.com/csc-scientific-blog/csc-news-rroom/viscosity-consistency-and-surface-tension-what-are-these-things.
James; Boger Fluids; Annu. Rev. Fluid Mech. 2009.41:129-142.
Boger; A Highly Elastic Constant-Viscosity Fluid; Journal of Non-Newtonian Fluid Mechanics, 3 (1977/1978) 87-91.
Dealy et al.; Official symbols and nomenclature of the Society of Rheology; Journal of Rheology, 2013 57, 1047-1055.
G.A. Davies, J.R. Stokes; Thin film and high shear rheology of multiphase complex fluids; Journal of Non-Newtonian Fluid Mechanics; Jan. 2008; pp. 73-87; vol. 148.
Nutritional Ingredients Included in Okra and Efficacy; Encyclopedia of Seasonal Foods; Dec. 1, 2014; pp. 1-2 (with English machine translation), URL, https://web.archive.org/web/20140121150645/https://foodslink.jp/syokuzaihyakka/syun/vegitable/okura4.htm.

* cited by examiner

TEA-BASED BEVERAGE

The invention relates to a tea-based beverage precursor and beverage. By "tea" is meant, for the purposes of the invention, *Camellia sinensis* var. *sinensis* and/or *Camellia sinensis* var. *assamica*.

WO 02/065846 A1 (Kao Corporation) discloses a beverage e.g. tea, containing a high concentration of catechins and at the same time having an improved taste with alleviated bitterness and astringency and smooth throat-feel upon drinking. This document further discloses that when a water soluble polymer is added to a highly concentrated catechins beverage containing both of non-epicatechins and epicatechins of non-polymerized type at a specific ratio, it is possible to obtain a beverage having a higher quality which is no longer affected by bitterness and astringency. Water soluble polymers contained in natural products are usable. Water-soluble-polymer-containing natural products usable in the beverage of the prior art include fruits such as blueberry and mandarin orange, vegetables such as dried gourd shavings, Japanese radish, burdock, Jew's mallow, Brussels sprouts, spinach, corn and soybean sprouts, cereals such as wheat and rice, beans such as red bean, soybean and pea, seaweed such as dried kelp, brown algae and brown seaweed, mushrooms such as Shiitake, Enokidake, Maitake, Matsutake and Eringii, and teas such as refined green tea, natural tea leaves, oolong tea and black tea.

SUMMARY OF THE INVENTION

The inventors have observed that the consumer perceived astringency of green and black tea beverages is surprisingly significantly reduced on addition of a selected water-dispersible biopolymer, in particular a water-dispersible biopolymer which has a Trouton ratio of at least 300, preferably 400, more preferably 450, measured as a 0.2% w/w aqueous solution at 20 degrees Celsius.

Thus in a first aspect of the invention, a tea-based beverage precursor is provided, the tea-based beverage precursor comprising tea solids and ≥0.01% w/w water-dispersible biopolymer, wherein the water-dispersible biopolymer has a Trouton ratio of at least 300, preferably 400, more preferably 450 measured as a 0.2% w/w aqueous solution at 20 degrees Celsius, wherein the weight ratio of tea solids to water-dispersible biopolymer is at least 2:1, preferably at least 3:1.

By "tea" is meant, for the purposes of the invention, *Camellia sinensis* var. *sinensis* and/or *Camellia sinensis* var. *assamica*.

The term "tea solids" means, for the purposes of the invention, dry material extractable from the leaves and/or stem of the plant *Camellia sinensis* var. *sinensis* and/or *Camellia sinensis* var. *assamica*. The leaves and/or stem may be substantially unfermented, known as white or green tea, partially fermented, known as oolong tea, or fermented, known as black tea, or a mixture thereof, thereby to produce white, green, oolong and black tea solids.

The term "Trouton Ratio" means, for the purposes of the invention, the dimensionless number provided by the extensional viscosity divided by the apparent shear viscosity. The Trouton Ratio is as measured in a 0.2% w/w aqueous solution of said ingredient at 20 degrees Celsius.

In a second aspect of the invention, a tea-based beverage is provided, the tea-based beverage comprising water and the tea-based beverage precursor of the first aspect of the invention, wherein the tea-based beverage comprises 0.0001 to 0.1% w/w of the water-dispersible biopolymer.

DETAILED DESCRIPTION OF THE INVENTION

The tea solids may originate from tea leaves and/or stem selected from the group consisting of white, green, oolong and black tea.

The water-dispersible biopolymer may be obtained from the group consisting of okra, prickly pear (Opuntia *ficus indica*) and Mekabu.

When the tea solids originate from tea leaves and/or stem from black tea, the tea-based beverage precursor preferably comprises milk solids, milk protein, or non-dairy creamer. Non-dairy creamer comprises vegetable fat and, despite the name, milk proteins like for example sodium caseinate. The non-dairy creamer may further comprise sugars like lactose. Non-dairy creamers are used to replace in whole or in part milk fat whilst still retaining the creamy mouthfeel that consumers are accustomed to.

The tea-based beverage precursor can comprise tea leaves, wherein the tea leaves comprise the tea solids. The term "tea leaves" means, for the purposes of the invention, whole or parts of the leaves and/or stems of the plant *Camellia sinensis* var. *sinensis* and/or *Camellia sinensis* var. *assamica*. The tea leaves may be substantially unfermented, known as white or green tea, partially fermented, known as oolong tea, or fermented, known as black tea, or a mixture thereof. Preferably the tea-based beverage precursor comprising tea leaves is packaged in a tea bag.

The tea-based beverage precursor may also optionally be in the form of a powder, granules or a liquid concentrate.

The tea-based beverage of the second aspect of the invention may be prepared by dissolving and/or dispersing a one part tea-based beverage precursor of the first aspect of the invention in water. Where the tea-based beverage precursor comprises tea leaves, the leaves may optionally be filtered from the liquid phase prior to consumption, for example by packaging the tea leaves in a bag. Where the tea-based beverage precursor is in the form of a powder, granules or a liquid concentrate, the resulting beverage may optionally be packaged in bottles, sachets or capsules. Capsules can be adapted to be used in conjunction with a tea brewing machines.

Mixing conditions can influence the properties of the resulting tea-based beverage. Short mixing times and/or medium, preferably low, shear favour the formation of a tea-based beverage according to the invention. Mixing at high shear and/or for a prolonged time may lead to a tea-based beverage which does not show reduced astringency. Mixing at high temperature 90 degrees centigrade for a few minutes) will also inactivate the water-dispersible biopolymer.

An alternative process for preparing the tea-based beverage of the second aspect of the invention is by starting with a tea-based beverage precursor of the first aspect of the invention wherein the tea solids and the water-dispersible biopolymer are separated into two separate components or parts. Water and the tea solids are homogenized and then the water-dispersible biopolymer is post-added under gentle shear.

To ease dissolution, the water-dispersible biopolymer may be coated onto maltodextrin particles or granules.

However, a skilled person may easily determine the proper mixing conditions by measuring the Trouton ratio of the tea-based beverage. Thus, preferably the tea-based beverage has a Trouton ratio of at least 250. The Trouton ratio of the tea-based beverage is the Trouton ratio as measured in a sample of said tea-based beverage at 20 degrees Celsius. Preferably the Trouton ratio of the tea-based beverage of the second aspect of the invention is ≤50 000, more preferably ≤10 000, most preferably ≤5 000.

Preferably the tea-based beverage comprises 0.05 to 3, preferably at least 0.06 to 0.5, most preferably at least 0.08, even more preferably at least 0.1% w/w tea solids.

The tea-based beverage comprises 0.0001 to 0.1, preferably 0.0005 to 0.1, most preferably 0.005 to 0.05% w/w water-dispersible biopolymer.

Example 1

The Trouton Ratios of Various Compounds/Extracts Materials
Okra fruit (*Abelmoschus esculentus* (L.) Moench)
Jew's mallow (*Corchorus olitorius*) leaves (Sonac Company, Alexandria, Egypt and The United Company for Food Industry, Egypt)
Lime flowers (Just Ingredients Limited, UK)
Guar gum (Grindsted™ Guar 250, Danisco)
Locust bean gum (Grindsted™ LBG 246)
Tara gum (Solgum D21004/82, Foreign Domestic Chemicals Corporation)
Sodium carboxymethyl cellulose (FMC)
Xanthan gum (CP Kelco)
k-Carrageenan (Danisco NS)
Flax seed gum (Shaanxi Fuheng (FH) Biotechnology Co. Ltd, China)
Sugar beet pectin (Pectin Betaspec RU 301 (Hernstreith & Fox KG)
Citrus pectin A (degree of esterification ~40% (GENU pectin LM-18 CG-Z (CP Kelco)))
Citrus pectin B (degree of esterification ~35% (GENU pectin LM-12 CG-Z (CP Kelco)))
Apple pectin powder (Solgar™ Vitamin and Herb, U.K)
OSA starch (octenyl succinic anhydride starch; National Starch).
SSPS (soluble soybean polysaccharides, obtained from Soy-FIBE).
HM citrus pectin (high-methoxyl citrus pectin, JM-150, obtained from CP Kelco).
Gum Arabic (Super Gum EM10, San-Ei Gen FFI Incorporated)
Yellow mustard gum (extracted from yellow mustard bran obtained from G S Dunn)
Prickly pear cactus (*Opuntia ficus-indica*) (opuntias.co.uk)
Mekabu (flowering sprout of *Undaria pinnatifida*) (Muso Limited)
Sodium alginate (Danisco NS)

A degree of esterification below 50% is considered low, and thus both citrus pectins A and B are considered to be low methoxy (LM) pectins.

Okra pectin was extracted from okra using the following method:
1. The okra was washed, the calyx removed and the remainder chopped roughly.
2. The chopped product was then blended with a double weight amount of 96% w/w ethanol initially using a handheld blender and then a Silverson homogenizer.
3. The blend was then sieved through a 75 micron sieve and the filtrate discarded.
4. The solids were resuspended in a double weight amount of 96% w/w ethanol and homogenised twice with a Silverson homogenizer.
5. The suspension was vacuum filtered through Miracloth (22-25 microns) and the filtrate discarded.
6. A suspension of 350 g of solid, 10 g NaCl and boiling water to a total volume of 5 litres was prepared.
7. The suspension was stirred with a paddle stirrer for at least 2 hours at 200 rpm.
8. The suspension was then centrifuged for 55 minutes at 4000 g and the supernatant decanted.
9. Ethanol was then added to the supernatant under hand stirring over 20 minutes to give a final concentration of 45% w/w ethanol.
10. The mixture was left to stand and precipitate at room temperature for at least 1 hour.
11. The suspension was filtered through 90 micron sieve and the filtrate discarded.
12. The precipitate (okra pectin) was rinsed using 96% w/w ethanol and freeze dried.

Jew's mallow pectin and lime flower pectin was extracted from their respective leaves using the following method:
1. Blend the whole leaves in 2 times their weight of food-grade ethanol: first with a handheld blender (20-30 seconds) then using a Silverson homogenizer (large screen) for 5-10 minutes.
2. Remove the pulp from the ethanol by filtering through Miracloth using a vacuum pump.
3. Re-suspend the pulp using more food-grade ethanol and filter again.
4. Repeat washing in ethanol and filtering twice.
5. Take 350 g of the pulp, add 10 g of NaCl and 350 g boiling water and mix well using a spoon, Make up to 5 L with boiling water.
6. Mix continuously using a paddle stirrer for at least 2 hours.
7. Centrifuge the mixture for 55 minutes at 4000 g using a Sorvall RC-3C centrifuge.
8. Decant the supernatant into 2×5 litre beakers and precipitate the pectin by addition of food-grade 96% ethanol up to approximately 47% w/w.
9. Filter the mixture to remove the precipitate using a 70-90 µm sieve.
10. Wash the precipitate using pure ethanol.
11. Dry the precipitate under vacuum in a freeze drier for at least 24 hour.
12. Grind the precipitate to a fine powder using a grinder and store in a cool, dry place until required.

Yellow mustard gum was extracted from yellow mustard bran according to the following method:
1. Mix 1 kg of bran powder well with 2.5-3 times weight (food grade) ethanol and leave for 10-20 minutes.
2. Sieve (90 µm).
3. Vacuum filter through Miracloth (single layer) discarding the ethanol and retaining the solid.
4. Wash twice with ethanol using vacuum filtration through Miracloth; mixing well between washes in order to remove pigments homogeneously.
5. Take 350 g of wet solid, add 10 g of NaCl, 350 g warm water and mix well.
6. Put under paddle stirrer and add boiling water to 4.8-5 litres total volume.

Ensure good mixing and stir gently for at least 2 hours.
7. Centrifuge for 55 minutes at 5000 g and decant supernatant into 2×5 litre beakers (discard solid).
8. Add supernatant in 400 ml aliquots to ethanol (90% of the weight of the supernatant) and hand mix slowly using a gentle, folding action. Mix well and leave to precipitate at room temperature for at least 1 hour with occasional stirring.

9. Sieve (90-250 μm).
10. Wash precipitate in ethanol.
11. Dry precipitate in freeze drier.
12. Grind precipitate to a fine powder (<1 mm) using a grinder.

Methods

The extensional viscosity was determined using a commercially available instrument, which is a Capillary Break-up Extensional Rheometer (CaBER 1 from THERMO Electron Corporation) according to the following procedure. A liquid sample was placed at 20° C. between two 6-mm diameter parallel discs sitting 2 mm from each other. The upper disc was quickly pulled up and within 0.05 s it reaches 8 mm separation. A transient liquid bridge (i.e. a filament) was thus formed between the two plates, which ultimately breaks up upon separation of the discs. The instrument measured the diameter of the midpoint of the liquid filament formed between the two discs and tracked its thinning until the break up point. The method has no means to control the rate at which the filament is thinning (i.e. the strain rate). This rate was determined by the balance of the capillary force, trying to shrink and break the liquid filament, and the opposing viscous force. The latter force was determined by the extensional viscosity which can vary as the contraction rate changes with time. The processing of the raw data and the calculation of the extensional viscosity was done using CaBER Analysis software (V 4.50 Built 29 Nov. 2004, designed by Cambridge Polymer Group, http://www.campoly.com). For the calculation of the Trouton ratio, the highest stable value of the extensional viscosity was used and the corresponding strain rate was recorded for later use to determine the corresponding shear viscosity value.

The CaBER Analysis software has a built-in function to select the usable range of data. It cuts off the data where the filament is too thick and its shrinkage is driven by the gravity and leaves the part where the shrinkage is due to the capillary force only. But in addition to this, the last data points were also removed where, after the break-up occurs, the retraction of the broken filament ends causes additional wavy features in the filament diameter curve.

Due to these instrumental limitations reliable values of the extensional viscosity were not obtained for all 0.2 wt. % solutions of ingredients in water, such as for some very thin and relatively inelastic solutions.

According to Jones et al (Rheologica Acta, 26, 20-30 (1987)), the Trouton ratio ($T_R$) can be defined as the ratio between shear ($\eta$) and extensional viscosity ($\eta_E$) using the following equation, where t is the strain rate:

$$T_R(\dot{\varepsilon}) = \frac{\eta_E(\dot{\varepsilon})}{\eta(\sqrt{3}\,\dot{\varepsilon})}$$

A high $T_R$ indicates a material with a high extensional viscosity or "stretchy" rheology. A material with a high extensional viscosity or "stretchy" rheology can also have a lower $T_R$ when the shear viscosity of the material is high. It is the maintenance of this "stretchy" rheology in the tea-based beverage of the second aspect of the invention which is believed important for sensory benefits.

The shear viscosity was measured using a Parallel-Plate geometry using either AR-2000 rheometer (from TA Instruments) or Physica MCR-501 (from Anton Paar). With the AR-2000, a 40 mm diameter plate was used and with the MCR-501 a 50 mm diameter plate was used. The viscosity was measured at 20° C. for a range of shear rates between 1 and 1000 s-1.

0.2% w/w aqueous solutions of the above-mentioned compounds/extracts were prepared and the Trouton ratio determined as described above.

Results

The extensional viscosities of 0.2% w/w solutions of OSA starch, gum Arabic, SSPS, sodium carboxymethyl cellulose, xanthan gum and a range of commercially available pectins and other biopolymers could not be measured with the equipment available due to very short filament lifetime. In order to obtain a Trouton ratio for these compounds more concentrated solutions were prepared until a reliable measurement could be made. It is assumed that the Trouton ratio of 0.2% w/w aqueous solutions of these compounds will be lower or at most equal to the Trouton ratio obtained at higher concentrations. The results are summarised in Table 1.

TABLE 1

Trouton ratio of various compounds/extracts as aqueous solutions at various % concentrations.

|  | Concentration (wt. %) | Trouton ratio |
| --- | --- | --- |
| OSA starch | 20 | 13.9 |
| Gum Arabic | 20 | 4.9 |
| SSPS | 20 | 8.1 |
| Sugar beet pectin | 4 | 3.6 |
| Sodium alginate | 2 | 3.9 |
| Sodium carboxymethyl cellulose | 2 | 35.0 |
| HM citrus pectin | 2 | 6.8 |
| Citrus pectin A | 2 | 3.3 |
| Citrus pectin B | 2 | 3.5 |
| Apple pectin | 2 | 3.2 |
| Xanthan gum | 1 | 12.7 |
| Locust bean gum | 1 | 29.5 |
| Guar gum | 1 | 13.3 |
| k-Carrageenan | 1 | 29.8 |
| Tara gum | 1 | 5.2 |
| Okra pectin | 0.2 | 572.1-950.1 |
| Jews mallow pectin | 0.2 | 250.9 |
| Lime flower pectin | 0.2 | 256.6 |
| Yellow mustard gum | 0.2 | 236 |
| Flax seed gum | 0.2 | 88 |
| Prickly pear cactus (juice)[1] | 0.2 | 1569 |
| Mekabu (aqueous extract)[2] | 0.2 | 660 |

[1]Obtained by squeezing pulp through muslin.
[2]Dried Mekabu was extracted by soaking in water (20 g in 100 ml) for 24 hours and squeezing through muslin.

Conclusions

The Trouton ratios of 0.2% w/w aqueous solutions of okra pectin, prickly pear cactus (aqueous extract) and Mekabu (aqueous extract) were found to be at least 300. The Trouton ratios of okra pectin, prickly pear cactus (aqueous extract) and Mekabu (aqueous extract) are clearly far above those of other commonly used plant extracts used in foods.

Example 2

Sensorial Impact (Astringency) of High Trouton Ratio Ingredient on Green Tea

Sensory evaluation of green tea comprising a range of test ingredients was conducted by a panel of 15 trained sensory assessors. In particular the effect on astringency was evaluated.

The green tea chosen was a sencha-style green tea (2 g per tea bag releasing 0.322 g of soluble solids in 100 ml water). The green tea beverage was prepared by:
 (a) Boiling tap water and allowing it to cool down to 80° C.;
 (b) Infusing 10 g of green tea in 1 litre of the cooled water for 2 minutes stirring 5 times;
 (c) Filtering the tea beverage through a strainer;
 (d) Adding the test ingredients as a 1 ml solution (or a 1 ml water blank for the control) to 49 ml of tea beverage.
 (e) The tea beverages were evaluated in duplicate at a temperature of approximately 60° C.

An Absolute Scaling Method was used as it can measure objectively the intensity of sensory attributes in foods, perceived by a panel of trained sensory assessors. The reference used for the intensity scale of this method was a range of concentrations of citric acid. With this method, attributes values are absolute. For instance an attribute score of 5 is half as intense as an attribute score of 10. This method provides highly reproducible data over time and assessors. According to this reference scale, panelists have to rate the intensity of each attribute on a 16-point scale (0-15) (thus for citric acid concentrations of 0.2, 0.4, 0.6 and 0.8 g per litre, the values on the 16 point scale were 2, 5, 8 and 11 respectively). Definitions of attributes and anchored points for control were available for the panelists during the assessment.

The impact on sensorial character (astringency) of green tea was evaluated with:
 1.00% w/v sucrose
 0.16% w/v starch sodium octenyl succinate
 0.08% w/v xanthan gum
 0.02% w/v okra pectin
 0.02% w/v theanine
 0.10% w/v soluble soy polysaccharides Okra pectin was prepared in accordance with the following steps:
1. Okra pods were washed, the calyx removed and the remainder chopped roughly.
2. The chopped material was blended and homogenized in the presence of a double weight of ethanol.
3. The resulting pulp was sieved (pore size sieve of 75 μm) and the remaining pulp mixed with ethanol and homogenized.
4. Solids were separated from the ethanol by vacuum filtration using a Miracloth (with a pore size of 22 to 25 μm) lining a Buchner funnel.
5. 350 g of the obtained solids was combined with 10 g NaCl and boiling water was added to a volume of 5 litres total.
6. The mixture was gently stirred with paddle stirrer for at least 2 hours at 200 rpm.
7. Then the mixture was centrifuged for 55 minutes at 4000 g and the supernatant mixed slowly with ethanol, to give a final concentration of ethanol of around 45% by weight, and hand stirred over a time period of around 20 minutes.
8. The mixture was then left for at least 1 hour to allow precipitation of okra pectin.
9. Finally the supernatant/ethanol mixture was sieved (pore size sieve of 90 μm) and the precipitate washed in ethanol and dried to obtain okra pectin.

Results

The results are summarized in Table 2 as a positive or negative percentage change from the control without a test ingredient.

TABLE 2

Change in perceived astringency (attributes dry and tart as mean of 2 values) of green tea when treated with one of sucrose, starch sodium octenyl succinate, xanthan gum and okra pectin (two separate groups of sensory evaluation)

| Test ingredient | Concentration of test ingredient (% w/v) | Dry (%) | Tart (%) |
|---|---|---|---|
| Control | — | 0 (ab) | 0 (a) |
| Sucrose | 1.00 | −10 (ab) | −10 (a) |
| OSA Starch | 0.16 | −10 (ab) | −13 (a) |
| Xanthan gum | 0.08 | −13 (ab) | −11 (a) |
| Control | — | 0 (a) | 0 (a) |
| Okra pectin | 0.02 | −15 (b) | −18 (b) |
| Theanine | 0.2 | +1 (ab) | −3 (a) |
| Soluble soy polysaccharides | 0.10 | 0 (ab) | −8 (ab) |

The results demonstrate that a reduction in perceived astringency (further separated by panel into "dry" and "tart" mouthfeel scores) might be achieved by different materials, but okra pectin unexpectedly exceeds all other evaluated materials in its efficacy to achieve that effect in green tea. It achieves a bigger impact on these sensory scores (only material achieving a statistically significant impact to the reference tea under these test conditions) and does so at a concentration between 4-8 times lower than the next effective test ingredients (OSA starch and xanthan gum).

Conclusions

Okra pectin surprisingly reduces perceived astringency in green tea and furthermore shows surprising efficacy at reducing astringency compared to other test ingredients (sucrose, starch sodium octenyl succinate, xanthan gum, theanine, and soluble soy polysaccharides).

Example 3

Sensorial Impact of High Trouton Ratio Ingredient on Black Tea

A similar sensory evaluation (astringency) to that described in Example 2 was performed on black tea with a variety of test ingredients.

The black tea chosen was Lipton yellow label tea blend (2 g per tea bag). The black tea beverage was prepared using boiling water and 20 g tea per litre of water.

The impact on sensorial character (astringency) of black tea was evaluated with:
 0.02% w/v Jews mallow pectin
 0.02% w/v lime flower pectin
 0.02% w/v guar gum
 0.005% w/v okra pectin
 0.01% w/v okra pectin
 0.02% w/v okra pectin Jews mallow pectin was prepared from the leaves in the manner described for okra pectin in Example 2 save steps 1 to 4 were omitted.

Lime flower (Just Ingredients Limited (UK)) pectin was prepared in accordance with the following steps:
1. Blend the whole leaves in 2 times their weight of food-grade ethanol: first with a held blender (20-30 seconds) then using a Silverson homogenizer (large screen) for 5-10 minutes.
2. Remove the pulp from the ethanol by filtering through Miracloth using a vacuum pump.
3. Re-suspend the pulp using more food-grade ethanol and filter again.
4. Repeat washing in ethanol and filtering twice.

5. Take 350 g of the pulp, add 10 g of NaCl and 350 g boiling water and mix well using a spoon, Make up to 5 L with boiling water.
6. Mix continuously using a paddle stirrer for at least 2 hours.
7. Centrifuge the mixture for 55 minutes at 4000 g using a Sorvall RC-3C centrifuge.
8. Decant the supernatant into 2×5 litre beakers and precipitate the pectin by addition of food-grade 96% ethanol up to approximately 47% w/w.
9. Filter the mixture to remove the precipitate using a 70-90 µm sieve.
10. Wash the precipitate using pure ethanol.
11. Dry the precipitate under vacuum in a freeze drier for at least 24 hour.
12. Grind the precipitate to a fine powder using a grinder and store in a cool, dry place until required.

The corresponding Trouton ratios for each beverage were also determined using the method described in Example 1 with the exception that the Physica MCR-501 (from Anton Paar) was used with a 25 mm diameter plate and shear rates up to 10 000 s$^{-1}$ were measured.

Results

The results are summarized in Table 3 as a positive or negative percentage change from the control without a test ingredient. Statistical analysis was performed using Student's T-test (P≤0.05) and letters assigned wherein common letters between two values means there is no significant difference.

TABLE 3

Change in perceived astringency (attributes dry and tart as mean of 2 values) of black tea when treated with one of Jews mallow pectin, lime flower pectin, guar gum and okra pectin. Student's T-test (P ≤ 0.05) with letters assigned wherein common letters between two values means there is no significant difference. Trouton ratios for each beverage are also included.

| Test ingredient | Concentration of test ingredient (% w/v) | Dry (%) | Tart (%) | Trouton ratio |
| --- | --- | --- | --- | --- |
| Control | N/A | 0 (a) | 0 (a) | — |
| Jews mallow pectin | 0.02 | −7 (b) | −18 (b) | <87 |
| Lime flower pectin | 0.02 | −6 (ab) | −13 (ab) | <213 |
| Guar gum | 0.02 | −3 (ab) | −6 (ab) | <172 |
| Okra pectin | 0.005 | −2 (ab) | −10 (ab) | 1335 |
| Okra pectin | 0.01 | −10 (b) | −20 (b) | 1776 |
| Okra pectin | 0.02 | −18 (c) | −38 (c) | 1093 |

The results clearly show that okra pectin surprisingly reduces perceived astringency in black tea and furthermore reduces perceived astringency (dry and tart) significantly more effectively than any of the other test ingredients (Jews mallow pectin, lime flower pectin, and guar gum).

CONCLUSIONS

Okra pectin surprisingly reduces perceived astringency in black tea and furthermore shows surprising significantly more efficacy at reducing astringency compared to other test ingredients (Jews mallow pectin, lime flower pectin, and guar gum).

The invention claimed is:

1. A tea-based beverage precursor comprising tea solids and ≥0.01% w/w water-dispersible biopolymer,
    wherein the water-dispersible biopolymer has a Trouton ratio of at least 300 measured as a 0.2% w/w aqueous solution at 20 degrees Celsius,
    wherein the weight ratio of tea solids to water-dispersible biopolymer is at least 2:1, and
    wherein the water-dispersible biopolymer is selected from the group consisting of okra pectin and prickly pear cactus juice.

2. The tea-based beverage precursor according to claim 1, wherein the tea solids originate from tea leaves and/or stem selected from the group consisting of white, green, oolong and black tea.

3. The tea-based beverage precursor according to claim 1, wherein when the tea solids originates from tea leaves and/or stem from black tea, the tea-based beverage precursor comprises milk solids, milk protein, or non-dairy creamer.

4. The tea-based beverage precursor according to claim 1, comprising tea leaves, wherein the tea leaves comprise the tea solids.

5. A tea-based beverage comprising water and the tea-based beverage precursor of claim 1, wherein the tea-based beverage comprises 0.01 to 0.1% w/w of the water-dispersible biopolymer.

6. The tea-based beverage according to claim 5, comprising 0.05 to 3% w/w tea solids.

7. The tea-based beverage precursor according to claim 1, wherein the water-dispersible biopolymer has a Trouton ratio of at least 400 measured as a 0.2% w/w aqueous solution at 20 degrees Celsius.

8. The tea-based beverage precursor according to claim 1, wherein the water-dispersible biopolymer has a Trouton ratio of at least 450 measured as a 0.2% w/w aqueous solution at 20 degrees Celsius.

9. The tea-based beverage precursor according to claim 1, wherein the weight ratio of tea solids to water-dispersible biopolymer is at least 3:1.

10. The tea-based beverage according to claim 5, comprising at least 0.06 to 0.5% w/w tea solids.

11. The tea-based beverage according to claim 5, comprising at least 0.08% w/w tea solids.

12. The tea-based beverage according to claim 5, comprising at least 0.1% w/w tea solids.

13. The tea-based beverage precursor according to claim 1, wherein the tea-based beverage precursor is in the form of a powder, granules or a liquid concentrate.

14. The tea-based beverage precursor according to claim 13, wherein the tea-based beverage precursor is in the form of a powder.

15. The tea-based beverage precursor according to claim 1, wherein the water-dispersible biopolymer is obtained from okra.

16. A tea-based beverage precursor comprising tea solids and ≥0.01% w/w water-dispersible biopolymer, wherein
    the water-dispersible biopolymer has a Trouton ratio of at least 450 measured as a 0.2% w/w aqueous solution at 20° C.,
    the weight ratio of tea solids to water-dispersible biopolymer is at least 2:1, and
    the water-dispersible biopolymer comprises okra pectin.

17. The tea-based beverage precursor according to claim 16, wherein the tea solids originate from tea leaves and/or stem selected from the group consisting of white, green, oolong and black tea.

18. A tea-based beverage comprising water and the tea-based beverage precursor of claim 16, wherein the tea-based beverage comprises 0.01 to 0.1% w/w of the water-dispersible biopolymer.

19. The tea-based beverage precursor according to claim 16, comprising 0.05 to 3% w/w tea solids.

20. A tea-based beverage precursor comprising tea solids and ≥0.01% w/w water-dispersible biopolymer,
    wherein the water-dispersible biopolymer has a Trouton ratio of at least 450 measured as a 0.2% w/w aqueous solution at 20° C.,
    wherein the weight ratio of tea solids to water-dispersible biopolymer is at least 2:1, and
    wherein the water-dispersible biopolymer comprises prickly pear cactus juice.

\* \* \* \* \*